(12) United States Patent
Manzanares et al.

(10) Patent No.: US 12,018,726 B2
(45) Date of Patent: Jun. 25, 2024

(54) ELECTRO-MECHANICAL ACTUATOR WITH INTEGRATED FAIL-OPERATIONAL MECHANISM

(71) Applicant: Skyryse, Inc., El Segundo, CA (US)

(72) Inventors: David James Manzanares, Snohomish, WA (US); Nozar George Sadeghi, Irvine, CA (US); Gonzalo Javier Rey, Torrence, CA (US); David Evan Edwards, Rancho Santa Margarita, CA (US)

(73) Assignee: Skyryse, Inc., El Segundo, CA (US)

( * ) Notice: Subject to any disclaimer, the term of this patent is extended or adjusted under 35 U.S.C. 154(b) by 0 days.

(21) Appl. No.: 18/143,911

(22) Filed: May 5, 2023

(65) Prior Publication Data

US 2023/0366441 A1 Nov. 16, 2023

Related U.S. Application Data

(63) Continuation of application No. 17/714,048, filed on Apr. 5, 2022, now Pat. No. 11,680,616.
(Continued)

(51) Int. Cl.
*F16H 25/20* (2006.01)
*F16D 55/224* (2006.01)
(Continued)

(52) U.S. Cl.
CPC .......... *F16D 65/18* (2013.01); *F16D 55/224* (2013.01); *F16H 25/2015* (2013.01);
(Continued)

(58) Field of Classification Search
CPC .. F16D 65/18; F16D 55/224; F16D 2066/003; F16D 2121/24; F16D 2125/40;
(Continued)

(56) References Cited

U.S. PATENT DOCUMENTS 4,637,272 A 1/1987 Teske et al.
7,946,403 B2 * 5/2011 Burke ..................... F16D 11/04
192/114 R
(Continued)

OTHER PUBLICATIONS

PCT International Search Report and Written Opinion, PCT Application No. PCT/US2022/023543, dated Jul. 1, 2022, 13 pages.

*Primary Examiner* — Randell J Krug
(74) *Attorney, Agent, or Firm* — Fenwick & West LLP

(57) ABSTRACT

Some embodiments relate to an electro-mechanical actuator that includes a screw, structurally segregated (split) housings, first and second nuts coupled to the screw, a sensor assembly, a plurality of motors, and a controller. The first nut is coupled to a first mounting point, and the second nut is coupled to a second mounting point. The sensor assembly may generate signals indicative of (e.g., relative) positions of left and right units of the actuator or positions of the first nut and the second nut on the screw. The controller controls the motors based on the signals generated by the sensor assembly. The motors may rotate each nut about a screw axis of the screw. This rotation results in one or both nuts moving along the screw. Movement between the first nut and the second nut along the screw adjusts a distance between the first mounting point and the second mounting point.

28 Claims, 13 Drawing Sheets

Related U.S. Application Data

(60) Provisional application No. 63/172,006, filed on Apr. 7, 2021.

(51) Int. Cl.
| | |
|---|---|
| *F16D 65/18* | (2006.01) |
| *F16H 25/22* | (2006.01) |
| *F16H 25/24* | (2006.01) |
| *F16D 66/00* | (2006.01) |
| *F16D 121/24* | (2012.01) |
| *F16D 125/40* | (2012.01) |

(52) U.S. Cl.
CPC ....... *F16H 25/205* (2013.01); *F16H 25/2204* (2013.01); *F16H 25/2454* (2013.01); *F16D 2066/003* (2013.01); *F16D 2121/24* (2013.01); *F16D 2125/40* (2013.01); *F16H 2025/2081* (2013.01)

(58) Field of Classification Search
CPC ............... F16H 25/2015; F16H 25/205; F16H 25/2204; F16H 25/2454; F16H 2025/2081; F16H 25/20
See application file for complete search history.

(56) References Cited

U.S. PATENT DOCUMENTS

| | | | |
|---|---|---|---|
| 8,006,815 B2 * | 8/2011 | Sommerfeld | B60T 13/24 |
| | | | 188/170 |
| 8,191,824 B2 | 6/2012 | Shaheen et al. | |
| 8,266,976 B2 | 9/2012 | Waide | |
| 8,450,894 B2 | 5/2013 | Blanding et al. | |
| 10,040,539 B2 | 8/2018 | Antunes et al. | |
| 10,065,728 B2 | 9/2018 | Cyrot | |
| 2015/0276029 A1 | 10/2015 | Marvin et al. | |
| 2020/0186005 A1 | 6/2020 | Borgarelli et al. | |

\* cited by examiner the figures is below.
ELECTRO-MECHANICAL ACTUATOR WITH INTEGRATED FAIL-OPERATIONAL MECHANISM

CROSS-REFERENCE TO RELATED APPLICATION

This application is a continuation of U.S. patent application Ser. No. 17/714,048, filed on Apr. 5, 2022, which claims priority to U.S. Provisional Patent Application Ser. No. 63/172,006, "Electro-Mechanical Actuator With Integrated Fail-Operational Mechanisms," filed on Apr. 7, 2021, each of which is incorporated herein by reference in its entirety.

TECHNICAL FIELD

The present disclosure generally relates to actuators, and specifically relates to an electro-mechanical actuator with one or more integrated fail-operational mechanisms.

BACKGROUND

Vehicles (e.g., aircraft and cars) are increasingly moving toward fly-by wire operation in which mechanical aspects of the vehicle are controlled via actuators. In these situations, actuators may be evaluated according to high safety standards to prevent loss of life and damage to property in the event of an actuator failure.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
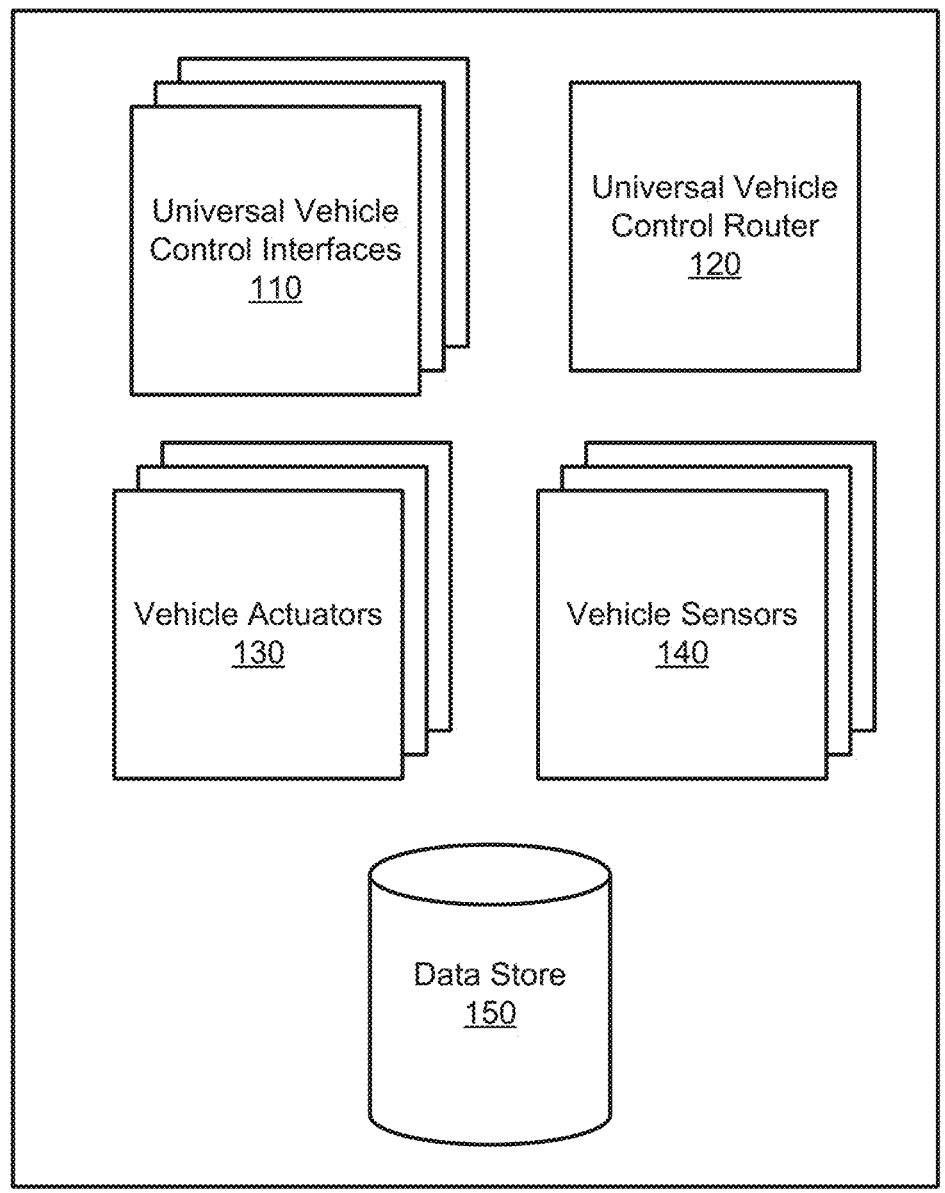
FIG. 1 illustrates one example embodiment of a vehicle control and interface system, according to one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An actuator system may perform actuator operations between a first component and a second component. In some situations, the actuator system includes multiple actuators coupled to multiple mounting points. Thus, if one or more actuators experience a failure, the system can continue to actuate the components. However, in some situations, each component only has a single mounting point and the space around the mounting points is limited (e.g., it is only large enough for a single actuator). In these situations, a single actuator without multiple fail-operational mechanism may be insufficient to actuate the components. For example, if the actuator experiences a failure, the actuator may be unable to further actuate the components.

Thus, embodiments may relate to an electro-mechanical actuator (EMA) with multiple integrated fail-operational mechanisms. A fail-operational mechanism is a component (or group of components) that enables the EMA to continue to operate even though some portion or component of the EMA has experienced a failure event. Some of the EMAs described herein are linear actuators that control a distance between two mounting points (e.g., a vehicle mounting point and a control surface input point). For example, an EMA can move the mounting points closer together, move them farther apart, maintain a fixed distance, or some combination thereof. Due to the multiple integrated fail-operational mechanisms, the EMA may be the only actuator coupled the components and the EMA may be coupled to only two mounting points (one for each component).

For example, some embodiments relate to an EMA with a screw, a first nut and a second nut coupled to the screw, a sensor assembly, a first motor, a second motor, a backup motor, and a controller. The first nut is coupled to a first mounting point, and the second nut is coupled to a second mounting point. The sensor assembly is configured to generate signals indicative of positions of the first nut and the second nut on the screw. The first motor is configured to rotate the first nut about an axis of the screw. The second motor and the backup motor are each configured to rotate the second nut about the axis of the screw. Movement between the first nut and the second nut along the screw adjusts a distance between the first mounting point and the second mounting point. The controller is configured to control the first motor, the second motor, or the backup motor based on the signals generated by the sensor assembly.

Example System Environment

FIG. 1 illustrates one example embodiment of a vehicle control and interface system 100. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. The vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control sticks inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft. Example actuators 130 are further described with reference to FIGS. 3A-6.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases, the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle.

The data store 150 is a database storing various data for the vehicle control and interface system 100. For instance, the data store 150 may store sensor data (e.g., captured by the vehicle sensors 140), vehicle models, vehicle metadata, or any other suitable data.

Figure 2:
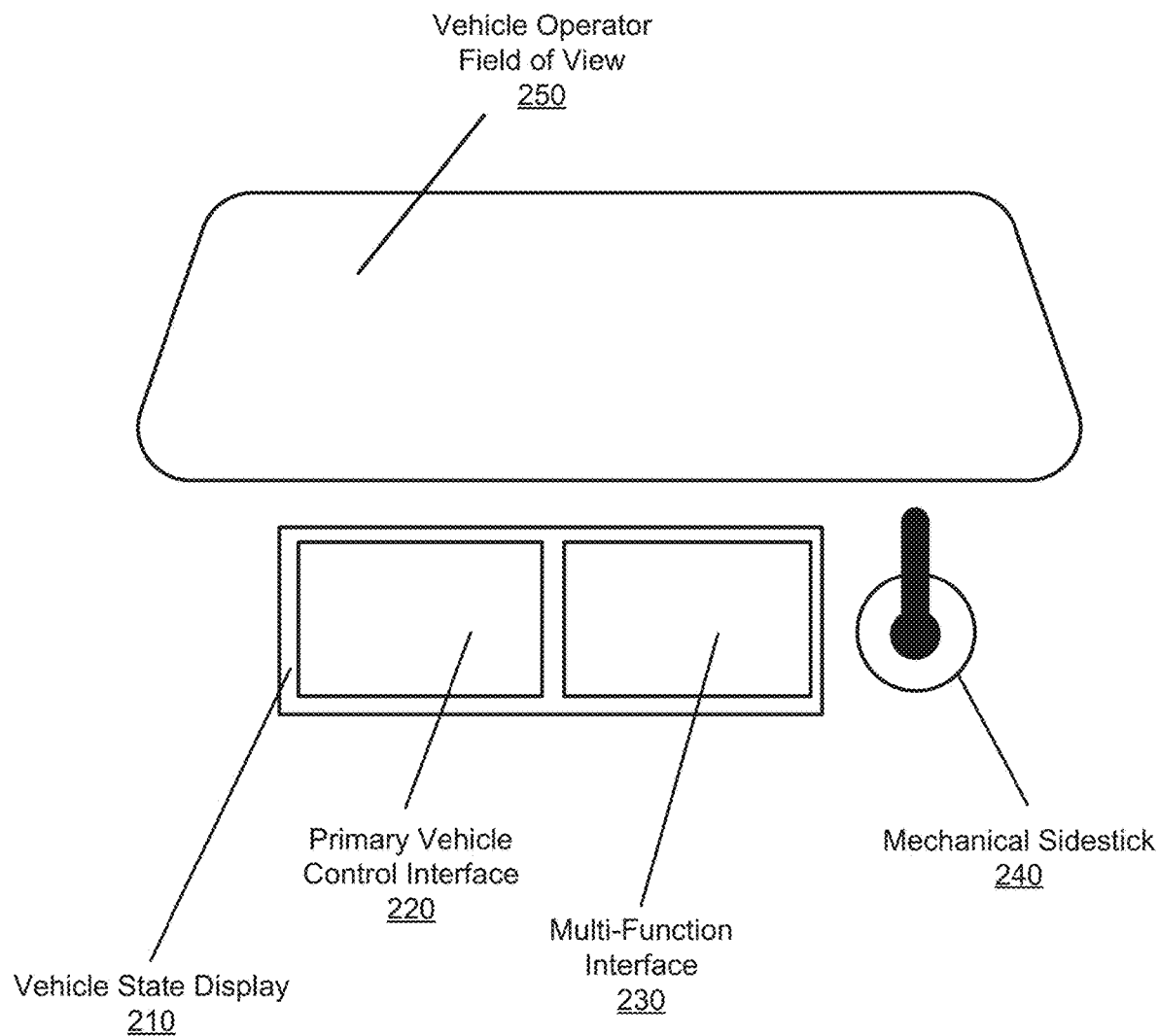
FIG. 2 illustrates one example embodiment of a configuration for a set of universal vehicle control interfaces in a vehicle, according to one or more embodiments.

FIG. 2 illustrates one example embodiment of a configuration 200 for a set of universal vehicle control interfaces in a vehicle. The vehicle control interfaces in the configuration 200 may be embodiments of the universal vehicle control interfaces 110, as described above with reference to FIG. 1. In the embodiment shown, the configuration 200 includes a vehicle state display 210, a side-stick inceptor device 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism.

As depicted in FIG. 2 the vehicle state display 210 includes a primary vehicle control interface 220 and a multi-function interface 230. The primary vehicle control interface 220 is configured to facilitate short-term of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority a use has across each axis of movement for the vehicle (e.g., available speed, turning ability, climb or descent ability for an aircraft, etc.). In the same or different example embodiments, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 220 fails, the vehicle state display 210 may display some or all of the primary vehicle control interface 220 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 210 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The side-stick inceptor device 240 may be a side-stick inceptor configured to receive universal vehicle control inputs. In particular, the side-stick inceptor device 240 may be configured to receive the same or similar universal vehicle control inputs as a gesture interface of the vehicle state display 210 is configured to receive. In this case, the gesture interface and the side-stick inceptor device 240 may provide redundant or semi-redundant interfaces to a human operator for providing universal vehicle control inputs. The side-stick inceptor device 240 may be active or passive. Additionally, the side-stick inceptor device 240 and may include force feedback mechanisms along any suitable axis. For instance, the side-stick inceptor device 240 may be a 3-axis inceptor, 4-axis inceptor (e.g., with a thumb wheel), or any other suitable inceptor.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 210 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

Example Electro-Mechanical Actuator

Figure 3A:
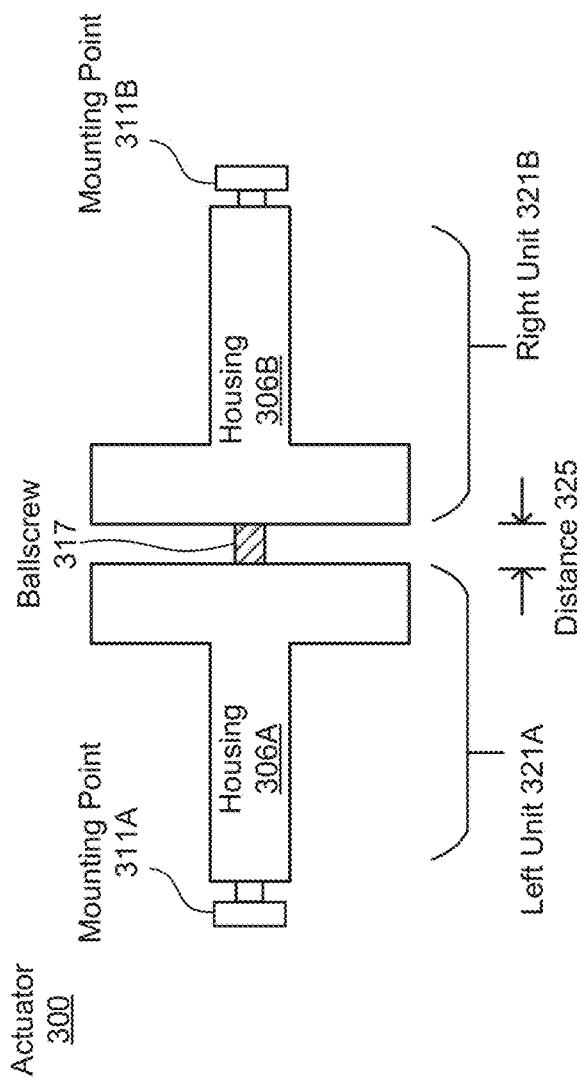
FIG. 3A is a side view of an electro-mechanical actuator, according to one or more embodiments.

FIG. 3A is a side view of an electro-mechanical actuator 300, according to one or more embodiments. The actuator 300 may be a vehicle actuator 130 as described above. For example, the actuator 300 actuates a portion of a vehicle responsive to an input from the primary vehicle control interface 220. Components of the actuator 300, such as ball nuts and motors, are contained in housings 306A and 306B and illustrated in subsequent figures. A left unit 321A of the actuator 300 is coupled to a first mounting point 311A and a right unit 321B is coupled to a second mounting point 311B (e.g., a vehicle mounting point and a control surface input point). The left unit 321A and the right unit 321B are coupled together by a ballscrew 317 and separated by distance 325.

Figure 3B:
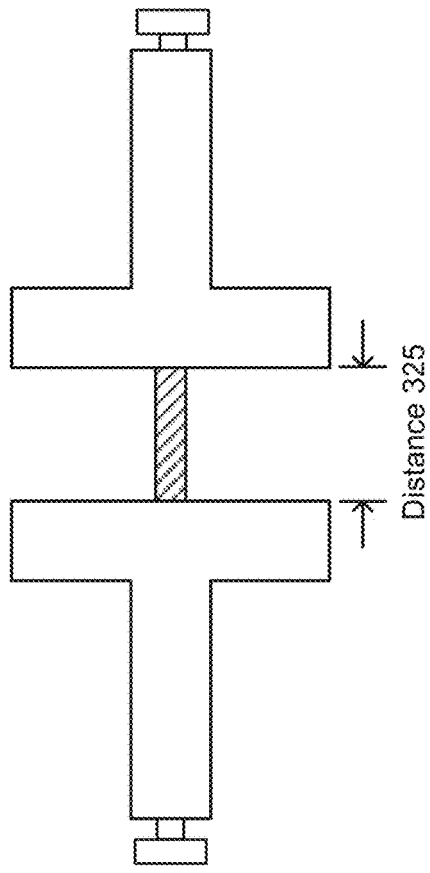
FIG. 3B is another side view of the actuator, according to one or more embodiments.

FIG. 3B is a side view of the actuator 300 (similar to FIG. 3A), except the left unit 321A and the right unit 321B are separated by a larger distance 325. As previously stated, the actuator 300 (e.g., via a controller module) may control the distance 325 between the mounting points 311. For example, FIG. 3A illustrates a situation where the mounting points 311 are close together and FIG. 3B illustrates a situation where the mounting points 311 are farther apart. Actuation may occur by each unit 321A, 321B moving along the ballscrew 317. The units of the actuator 300 may operate independently. Thus, for example, if one of the units (e.g., 321A) experiences a failure, the other unit (e.g., 321B) may continue to move along the ballscrew 317 to keep the actuator functional. If both units are operational, the actuation rate may be double the actuation rate of an actuator with only a single unit (depending on the actuation rate of each unit 321A, 321B).

Figure 4A:
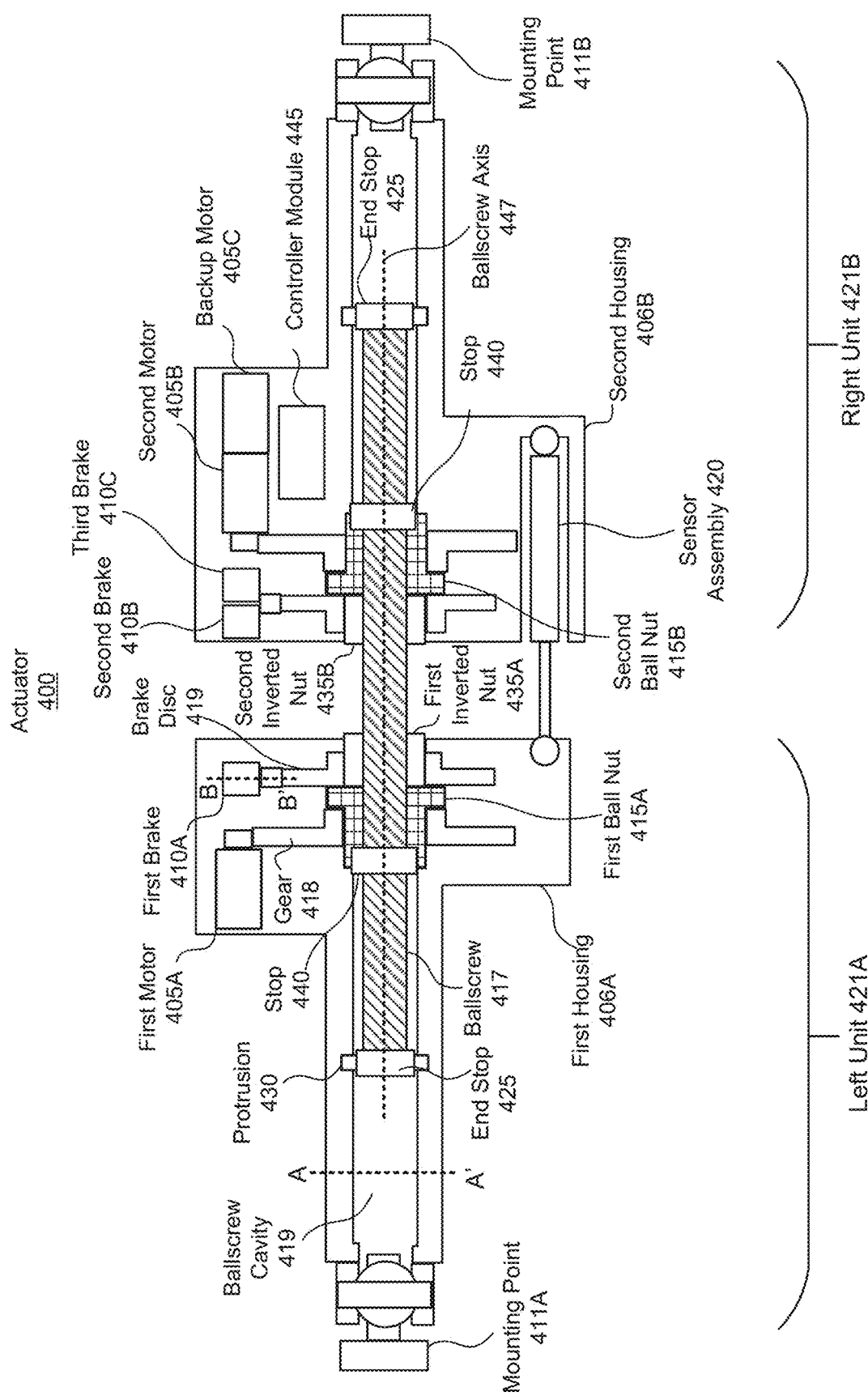
FIG. 4A is a block diagram of a cross sectional view of an electro-mechanical actuator, according to one or more embodiments.

FIG. 4A is a block diagram of a cross sectional view of an actuator 400, according to one or more embodiments. The actuator 300 may be an embodiment of the actuator 400. FIG. 4A includes a ballscrew 417, a cavity 419, a first ball nut 415A, a second ball nut 415B, a sensor assembly 420, a first motor 405A, a second motor 405B, a backup motor 405C, a first brake 410A, a second brake 410B, a third brake 410C, an end stop 425, a protrusion 430, multiple stops 440, a first inverted nut 435A, a second inverted nut 435B, and a controller 445. The actuator may include additional, fewer, or different components than illustrated. For simplicity, this disclosure describes the actuator 400 as including a ballscrew 417 and ball nuts 415A, 415B. However, the actuator 400 may include other screw and nut types, such as ACME screws or roller screws (and their corresponding nuts).

Actuator 400 may include gears coupled to the ball nuts 415. Motor pinions of the motors 405 may engage with the gears to rotate the ball nuts 415. Example gear 418 is labeled in FIG. 4A. Actuator 400 may include brake discs coupled to the ball nuts 415 or the inverted nuts 435. The brake discs may have notches that allow the brakes 410 to engage with the discs. Example brake disc 419 is labeled in FIG. 4A.

In some embodiments, each housing 406 includes a two or more load paths. Thus, in the event of one of the housings (e.g., 406A) experiencing a failure (e.g., a rupture), the two or more load paths may ensure that the failure does not cause a loss of pin-to-pin structural integrity. Two (or more) load paths may be implemented by each housing (e.g., 406A and 406B) including two (or more) portions coupled together (e.g., a top half coupled to a bottom half). Thus, for example, a fracture in one of the portions, will not propagate through the entire housing (e.g., and cause loss of control of the mounting points 411, 411B). This may be important for applications in which the actuator is the only actuator for each control surface (e.g., coupled to the mounting points 411A, 411B). Each housing may also include a clevis (used for coupling to the mounting points 411A, 411B) made of a structure separate from the two or more portions. In some embodiments, if the actuator.

The ballscrew 417 is a rod with helical grooves (e.g., threads). The length of the ballscrew may be based on a target range of actuation for the two (e.g., vehicle) mounting points 411. Design parameters of the ballscrew may include length, load, torque, thread pitch, thickness, and material type (e.g., stainless steel). Values of the design parameters may be based on resolution of actuation, load, speed of movement, weight, and chance of failure. In some embodiments, the length of the ballscrew 417 is at least twice the target range of actuation. Thus, if one unit (e.g., 421B) experiences a failure (e.g., one of the nuts becomes jammed), the other unit (e.g., 421A) may still have enough range of movement along the ballscrew 417 to keep the actuator 400 functional (e.g., across a required operating stroke).

In some embodiments, the ballscrew 417 includes a rod. The rod may provide a secondary load path for the ballscrew 417. For example, in the event of the ballscrew 417 experiencing a failure event, the rod may carry tensile and torsional loads between the ends of the ballscrew 417. The ballscrew 417 may be hollow and the rod may fit inside the hollow ballscrew 417 and be long enough to couple to both ends of the ballscrew 417. In some embodiments, the ballscrew 417, ball nuts 415A, 415B, rod, stops 440 and end stops 425 are made of metal, such as stainless steel.

The first ball nut 415A and the second ball nut 415B are coupled to the ballscrew 417 and are configured to rotate about the ballscrew 417 (about axis 447). The first ball nut 415A and the second ball nut 415B are collectively referred to as ball nuts 415. The ball nuts 415 may have helical grooves (e.g., threads) that match or correspond to the helical grooves of the ballscrew 417. Balls roll between the grooves to provide contact between a ball nut and the ballscrew 417. The ball nuts 415 may include seals at one or both ends to prevent contamination ingress and for lubrication retention. In some embodiments, a ball nut (e.g., 415A) is a multi-circuit ball nut.

The motors 405 enable multiple drive channels to control the actuator 400 (motors 405A-C are collectively referred to as motors 405). For example, if a single drive channel fails, one or more of the remaining channels may be used to control the actuator 400. One or more of the motors 405 may be a brushless DC motor, a synchronous reluctance motor, or a brush DC motor. Among other advantages, a brushless motor may result in less motor wear compared to brush motors. The motors 405 are configured to rotate the ball nuts 415 about the axis 447 of the ballscrew 417 (e.g., via a geared drive interface). Rotating a ball nut (e.g., 415A) about the ballscrew 417 results in the ball nut moving along the length of the ballscrew 417. Thus, the motors 405 may rotate the ball nuts 415 in either direction (e.g., clockwise or counterclockwise) about axis 447 in order to move the ball nuts 415 in either direction along the length of the ballscrew 417. The motors 405 may each generate signals that indicate the position of a corresponding ball nut (e.g., 415A or 415B) on the ballscrew 417. For example, a motor (e.g., 405A) may track the number of rotations of a ball nut (e.g., 415A) about the ballscrew 417.

In the example of FIG. 4A, the first motor 405A is contained in the first housing 406A and is configured to rotate the first ball nut 415A. The second motor 405B is contained in the second housing 406B and is configured to rotate the second ball nut 415B. Movement of the first ball nut 415A along the ballscrew 417, movement of the second ball nut 415B along the ballscrew, or movement of both the first ball nut 415A and the second ball nut 415B along the ballscrew 417 may adjust a distance between the mounting points 411A, 411B. In this manner, the actuator 400 may convert rotation of the ball nuts 415 into a linear actuation.

Although not illustrated in FIG. 4A, the motors 405 may each include motor control electronics ("MCE") that control the motor. For example, the controller module 445 controls the motors 405 by sending control signals to the MCE of each motor.

The example of FIG. 4A includes a backup motor 405C for the second motor 405B. Generally, the actuator 400 may include one or more backup motors in the first housing 406A, the second housing 406B, or both the first and second housings 406A, 406B. Each backup motor in an actuator (e.g., 400) may be configured to back up a respective motor that is coupled to the backup motor. Thus, in the example of FIG. 4A, if motor 405B fails, the backup motor 405C can rotate the corresponding second ball nut 415B instead, thereby providing a fail-operational mechanism. Additionally, or alternatively, a backup motor may be used to assist a corresponding functional motor for difficult actuation tasks (e.g., add additional power, torque, etc.). For example, backup motor 405C may assist motor 405B for a difficult actuation task.

In some embodiments, the controller 445 is configured to determine if a motor has failed, identify one or more backup motors associated with the failed motor, and then use the identified one or more backup motors to adjust the distance between the mounting points 411A, 411B. If the controller 445 determines that the failed motor doesn't have a backup motor associated with it, the controller 445 may instruct the failed motor to stop and may instruct another motor (e.g., on an opposite unit) to adjust the distance between the mounting points 411A, 411B. In some embodiments, the controller 445 may follow instructions that don't require the controller 445 to identify a backup motor or determine whether a failed motor has a backup motor. For example, the controller 445 may follow instructions that instruct the controller 445 to use the backup motor 405C responsive to the second motor 405B failing and that instruct the controller 445 to use the second motor 405B or the backup motor 405C responsive to the first motor 405A failing.

Each housing 406A, 406B may form a ballscrew cavity (e.g., 419) that allows the ballscrew 417 to move within the housing (e.g., when a motor rotates a nut). For example, as the first motor 405A rotates the first ball nut 415A, the end of the ballscrew 417 moves toward or away from mounting point 411A in ballscrew cavity 419 (depending on the rotation of the nut).

An end stop 425 is coupled to the end of the ballscrew 417 and is configured to prevent (or reduce) the ballscrew 417 from rotating about ballscrew axis 447. Thus, the end stop 425 may be referred to as an anti-rotation feature.

The end stop 425 includes a protrusion 430 that extends away from the ballscrew axis 447 and into a groove formed by the inner wall of the ballscrew cavity 419. The groove may run along the ballscrew cavity 419. As the ballscrew 417 moves in the ballscrew cavity 419, the protrusion 430 slides along the groove and may prevent the ballscrew 417 from rotating about ballscrew axis 447. The end stop 425 may include multiple protrusions that fit into one or more grooves in the ballscrew cavity 419 (e.g., to reinforce the first protrusion 430). Additional details about the groove are described with respect to FIG. 4B.

The sensor assembly 420 is configured to monitor positions of the first ball nut 415A and the second ball nut 415B. The sensor assembly 420 includes one or more sensors that generate signals indicative of positions (or changes in positions) of the first ball nut 415A or the second ball nut 415B on the ballscrew 417. A sensor may generate signals by interacting directly or indirectly with one or both ball nuts 415 or a component coupled to one or both ball nuts 415.

The sensor assembly 420 may include one or more sensors that measures the relative position of one ball nut (e.g., 415A) relative to another ball nut (e.g., 415B). For example, the sensor may measure the distance (e.g., axial separation) between the ball nuts 415 along the ballscrew. Example relative sensors include a linear variable displacement transducer (LVDT), a potentiometer, or an absolute magnetic encoder. In the example of FIG. 4A, the sensor assembly 420 includes a LVDT sensor coupled to both the first housing 406A and the second housing 406B.

The sensor assembly 420 may include one or more sensors that measures the position of a ball nut (e.g., 415A) relative to the ballscrew 417. For example, the sensor generates signals that indicate the amount of rotation of a ball nut (e.g., the total number of clockwise rotations of the ball nut about the ballscrew 417). In some embodiments, one or more sensors of the sensor assembly 420 sense movement (e.g., rotation) of a gear (e.g., 418) or a brake disc (e.g., 419) to generate signals. Example sensors include a proximity sensor, a resolver, an absolute optical encoder, or a rotary magnetic encoder.

Multiple sensors may be used in combination to monitor positions of the ball nuts 415. For example, a LVDT may be positioned in the second housing 406B and coupled to the first housing 406A (e.g., as illustrated in FIG. 4A) to monitor a distance between the first housing 406A and the second housing 406B. Additionally, a magnetic or optical encoder may be used in each housing 406A, 406B to monitor revolutions of each ball nut 415A, 415B. Note that a resulting distance between the two attachment points is a result of motion of the ball nut 415A and the ball nut 415B. An overall distance may be derived from nut rotations (rather than relative positions of the housing) by summing the motion caused by rotation of ball nut 415A to motion caused by rotation of ball nut 415B.

In the example of FIG. 4A, the actuator 400 includes a first inverted nut 435A in housing 406A and coupled to the first ball nut 415A and a second inverted nut 435B in housing 406B and coupled to the second ball nut 415B. The first inverted nut 435A and the second inverted nut 435B may be collectively referred to as inverted nuts 435. An inverted nut (e.g., 435A) may be coupled to a ball nut (e.g., 415A) such that the inverted nut rotates with the ball nut. In some embodiments, an inverted nut is like a regular nut that mates with a regular screw except that the thread form of an inverted nut matches the thread profile of the ballscrew 417 with some clearance. An inverted nut may be made of metal, such as aluminum-nickel-bronze, stainless steel, beryllium copper, etc. The inverted nuts 435 may include features that act as mechanical stops between the ball nuts 415 and may limit movement of the ball nuts 415 along the ballscrew 417.

Thus, the inverted nuts 435 may prevent the ball nuts 415 from (e.g., unintentionally) impacting each other as the ball nuts 415 move along the ballscrew 417. In some embodiments, the purpose of an inverted nut (e.g., 435A) is to provide a redundant load path in the event of a ball nut failure. For example, if a ball nut fails structurally (e.g., all the balls fall out), the inverted nut may keep the ballscrew 417 connected to the bearings and the housing. An inverted nut (e.g., 435A) may include a seal at one or both ends to prevent contamination ingress and for lubrication retention.

In some embodiments, an actuator (e.g., 400) includes a stop 440 coupled to an outer end of a ball nut (e.g., 415A) and an end stop 425 coupled to an end of the ballscrew 417. These components may act as mechanical stops similar to the inverted nuts 435. Thus, an end stop 425 and stop 440 pair may prevent a ball nut (e.g., 415A) from sliding off of the end of the ballscrew 417 (e.g., in a situation where a motor (e.g., 405A) or the controller 445 lose track of the position of the ball nut).

In some embodiments, an actuator (e.g., 400) includes one or more brakes 410 (brakes 410A-C may be collectively referred to as brakes 410). In the example of FIG. 4A, the actuator 400 includes a brake for each motor. Each brake is coupled to a corresponding ball nut (e.g., via an inverted nut). In the example of FIG. 4A, first brake 410A is coupled to the first ball nut 415A and second brake 410B and third brake 410C are coupled to the second ball nut 415B. When a brake (e.g., 410A) is engaged, it may prevent the corresponding ball nut (e.g., 415A) from rotating about the ballscrew 417. Thus, if a motor (or another component) experiences a failure (e.g., loses power or motor runaway), the brake may prevent the corresponding ball nut from moving along the ballscrew (e.g., in an uncontrolled manner). Bakes may also be part of a secondary load path. In the event of certain failure events, such as a motor shaft fracture, a gear failure, or a bearing failure, a brake may provide a secondary means to prevent ball nut rotation. Otherwise under loads, the ball nut may be back-driven.

The controller module 445 controls components of the actuator 400. In some embodiments, the controller 445 is a universal vehicle control router 120. In the example of FIG. 4A, the controller 445 is in the second housing 406B. However, this is not required. The controller 445 may be in the first housing 406A, both housings, or in neither of the housings. Additionally, the controller 445 may be located at a different place in the second housing 406B. The controller 445 may be a single module or it may include multiple modules (e.g., distributed in the left and right units 421A, 421B). A controller 445 with multiple modules may prevent a failure event from disabling all actuator control channels. The controller 445 may receive an input (e.g., instructions) to actuate the actuator 400 (e.g., from a vehicle control system, a universal vehicle control interface 110, or a universal vehicle control router 120). The input may specify actuation parameters (e.g., an amount of actuation, a rate of actuation, or a time to begin or end actuation). Additionally, or alternatively, the controller 445 may determine the actuation parameters based on the input. After the actuation parameters are determined, the controller 445 may instruct a motor (e.g., 405A) to move a ball nut (e.g., 415A) along the ballscrew 417 according to the parameters. The controller 445 may instruct one or more motors 405 to achieve a target actuation. For example, the controller 445 instructs the first motor 405A and the second motors 405B such that the first ball nut 415A and the second ball nut 415B simultaneously move away from each other (increasing a distance between the mounting points 411A, 411B) or move toward each other (decreasing a distance between the mounting points 411A, 411B) along the ballscrew 417.

The controller 445 may control the motors 405 based on the signals received from the sensor assembly 420 (e.g., in addition to the input). For example, the controller 445 may use signals from the sensor assembly 420 to (1) determine the positions (or changes in position) of the first ball nut 415A and the second ball nut 415B on the ballscrew 417 and (2) adjust the distance between the first ball nut 415A and the second ball nut 415B based on the determined positions. In some embodiments, signals from the sensor assembly 420 may be additionally monitored by a second controller (e.g., located in a different housing). For example, the controller 445 and a second controller both monitor signals from the sensor assembly 420 in order to provide independent checks and monitoring.

As previously described, the motors 405 may provide signals indicative of positions (or changes in positions) of the ball nuts 415. Thus, the controller 445 may determine ball nut positions based on signals from one or more of the motors 405 and may provide control instructions to one or more of the motors 405 based on these positions. For example, the controller 445 may track the number of rotations of the ball nuts 415 about the ballscrew 417 based on signals from the motors 405. However, it may be advantageous to provide a fail-operational mechanism. For example, the motor signals may be unreliable, inaccurate, or prone to errors (e.g., a motor signal doesn't indicate motor runaway). Thus, signals from the sensor assembly 420 may be used to check or in conjunction with the motor signals to determine positions of the ball nuts 415. For example, the controller 445 may compare (1) position determinations based on the motor signals with (2) position determinations based on the sensor assembly signals to determine positions of the ball nuts 415. If the results of (1) and (2) diverge, then the channel (e.g., a controller, a motor, and a motor position feedback sensor) may be disabled by the controller 445, and one or more of the other channels may take over. In some embodiments, signals from the motors 405 are not used to determine positions of the ball nuts 415 (e.g., the controller 445 only uses signals from the sensor assembly 420 to determine positions of the ball nuts 415). In some embodiments, motor signals are used for motor power commutation and signals from the sensor assembly 420 are used to track the ball nut positions.

The controller 445 may use signals from the sensor assembly 420 or signals from the motors 405 to determine if a failure event (e.g., malfunction) occurred. A failure event occurs when a component ceases to function, the component malfunctions, or the component's functionality is reduced below a predetermined threshold. An example failure is a jam between a ball nut (e.g., 415A) and the ballscrew 417 that prevents movement of the ball nut along the ballscrew 417. Another example failure is a motor (e.g., 405A) losing count of the number of ball nut rotations about the ballscrew 417. Another example failure is a motor (e.g., 405A) breaking down and being unable to rotate a ball nut (e.g., 415A).

After determining a failure event occurred, the controller 445 may control one or more of the motors 405 based on the failure event. For example, in cases where a failure results in a first unit (e.g., the left unit 421A) becoming inoperative (e.g., a ball nut becomes jammed or a motor without a backup motor fails), the brake on the failed side may be engaged and the remaining unit (e.g., the right unit 421B) may still be able to fully actuate the actuator 400. However, if one unit is inoperative, the rate of actuation may be less (e.g., half) that of the rate of actuation when both units are operating correctly (depending on the rate of actuation of each unit). Or if each channel can drive an actuator (e.g., 400) at full rate, failures do not affect rate until all channels fail. In this manner, the two units 421A, 421B allow redundancy and are a fail-operational mechanism. In this context, 'fully actuate' refers to the ability to actuate at least to a target (e.g., threshold) range of actuation between the two mounting points 411A, 411B.

To ensure that both units 421A, 421B can fully actuate the actuator 400, the controller 445 may control the motors 405 so that the first ball nut 415A remains along on a first portion of the ballscrew 417 (e.g., a first half) and so that the second nut 415B remains along a second different portion of the ballscrew 417 (e.g., a second half). Thus, if one of the units experiences a failure such that it can no longer move along the ballscrew 417, the remaining unit may still have access to enough of the ballscrew 417 to fully actuate the actuator 400.

In cases where a motor failure occurs but a backup motor (e.g., 405C) is present, the controller 445 may determine the motor (e.g., 405B) has failed and instruct the backup motor (e.g., 405C) to take over operation of the failed motor (e.g., 405B). In this case, the controller 445 may also instruct the failed motor (e.g., 405B) to stop operating or to stop rotating a corresponding ball nut (e.g., 415B).

In some embodiments, if/when a motor (e.g., 405A) experiences a failure event, the controller 445 may reset the motor. For example, the controller 445 may turn off and turn on the motor. In another example, the controller 445 resets parameters of the motor. In another example, if the motor experiences motor runaway, the controller 445 may use signals from the sensor assembly 420 to inform the motor of its correct position on the ballscrew 417. Thus, resetting a motor (e.g., with the help of the sensor assembly 420) is another fail-operational mechanism of the actuator 400. If a motor reset does not fix the failure event (or a similar failure event occurs within a threshold time after the reset), the controller 445 may instruct the motor to stop rotating the corresponding ball nut and may instruct a backup motor to rotate the ball nut (assuming a backup motor is present).

Accordingly, an actuator (e.g., 400) may include a plurality of fail-operational mechanisms that may allow the actuator to continue operating even if one or more failure events occur. Due to the fail-operational mechanisms, the actuator (e.g., 400) may be the only actuator coupled to the mounting points (e.g., 411A, 411B) or the actuator may be mounted to only the mounting points. Since different applications of an actuator (e.g., use in a ground vehicle vs. an aerial vehicle) may have different safety requirements, the number and type of fail-operational mechanisms of the actuator may depend on the application of the actuator. For example, the number of backup motors may be set to meet or exceed a particular safety requirement associated with an actuator application.

Figure 4B:
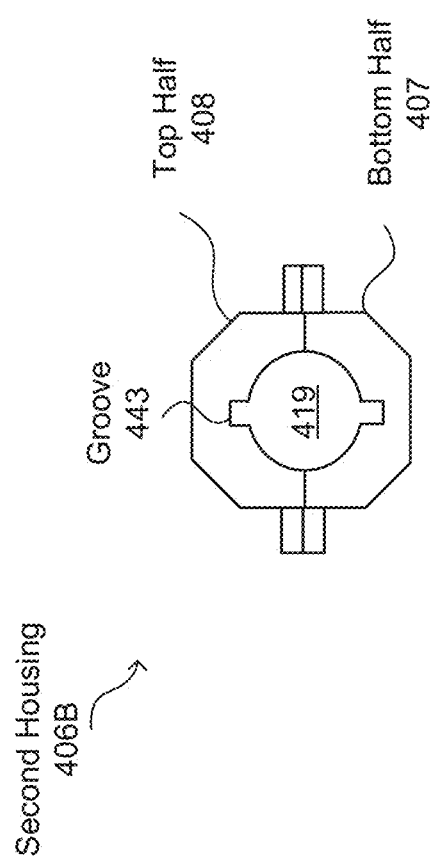
FIG. 4B is a cross sectional diagram of a housing of the actuator, according to one or more embodiments.

FIG. 4B is a cross sectional diagram of housing 406B as seen from plane A-A' in FIG. 4A, according to one or more embodiments. As described, above, the ballscrew cavity 419 may include a groove 442 (or multiple grooves) that run along the ballscrew cavity 419. The protrusion 430 of the end stop 425 may slide along the groove 442 to prevent the ballscrew 417 from rotating. Furthermore, the housing 406B includes a top half 408 and a bottom half 407 (e.g., to form multiple load paths).

Figure 4C:
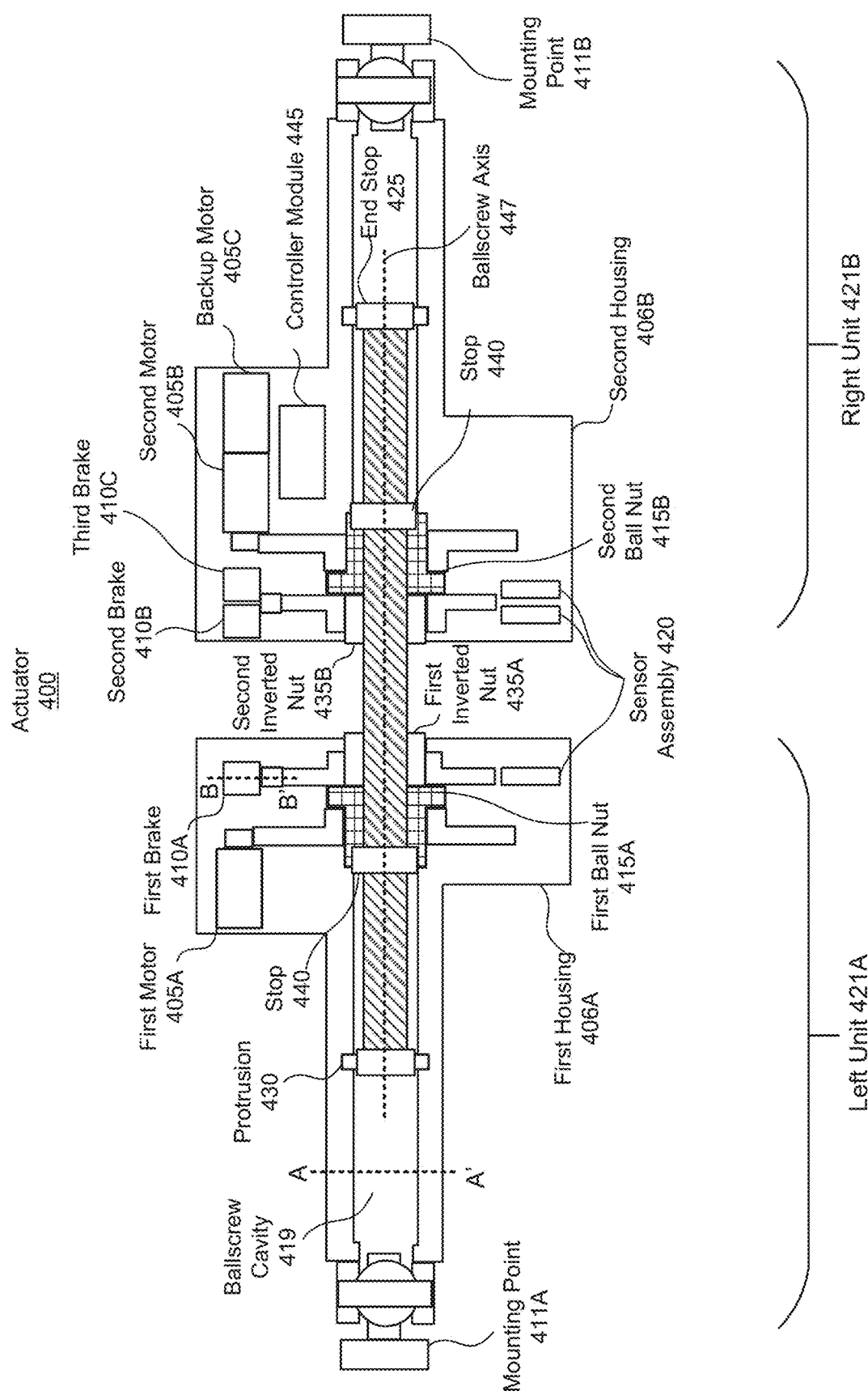
FIG. 4C is another block diagram of an actuator, according to one or more embodiments.

FIG. 4C is another block diagram of actuator 400, according to one or more embodiments. FIG. 4C is similar to FIG. 4A except the sensor assembly 420 includes three different sensors (instead of the single LVDT sensor illustrated in FIG. 4A). The sensors in FIG. 4C include a first sensor in the first housing 406A and a second sensor and a backup sensor in the second housing 406B. The first sensor generates signals indicative of the position of the first ball nut 415A. The second sensor and backup sensor generate signals indicative of the position of the second ball nut 415B. The controller 445 may use signals from the backup sensor if the second sensor experiences a failure event. Among other advantages, packaging may be simpler when one sensor on each nut is used and the two positions are summed together instead of having one sensor between the two housings.

Figure 5A:
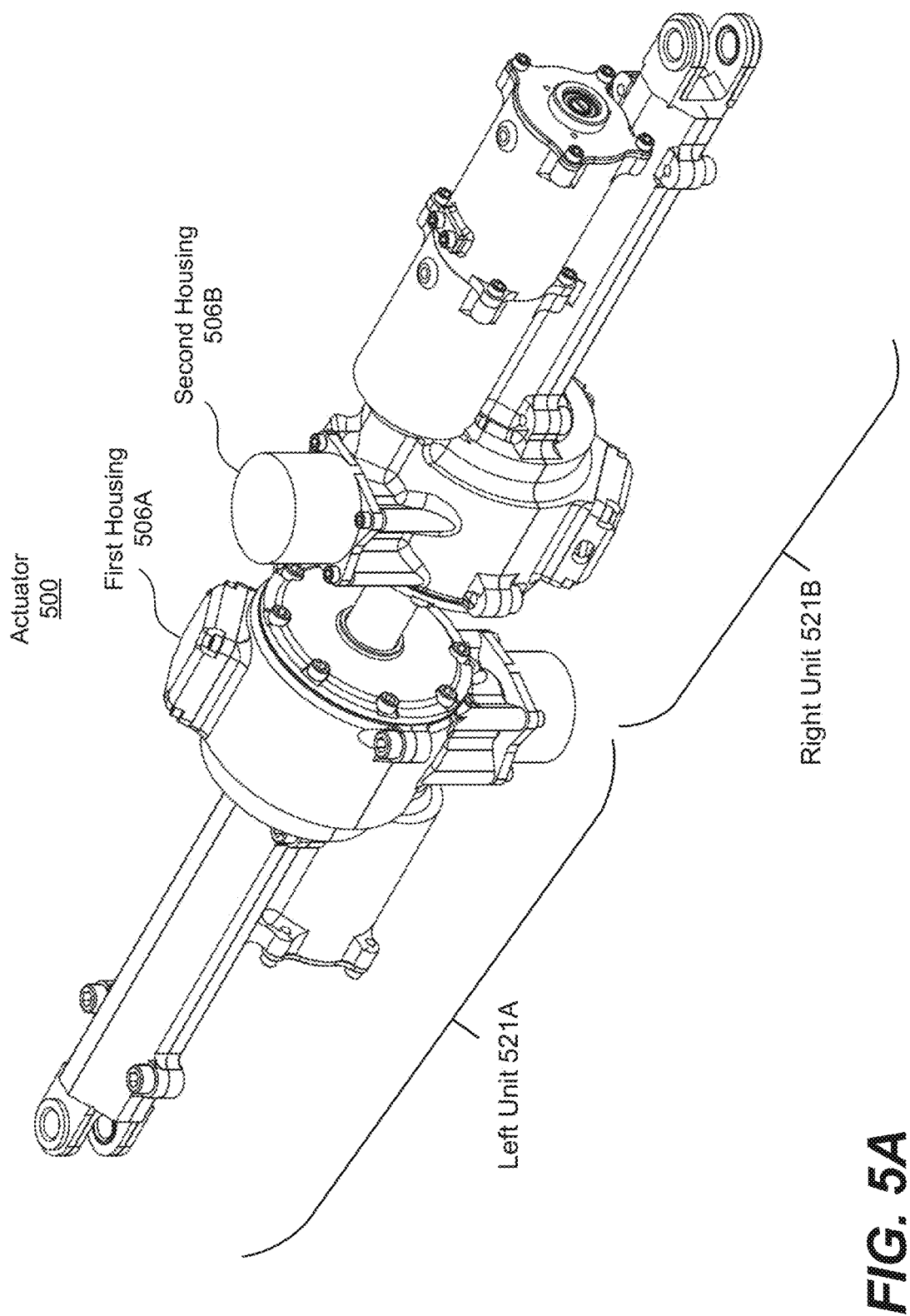
FIG. 5A is a perspective view of an electro-mechanical actuator, according to one or more embodiments.
Figure 5B:
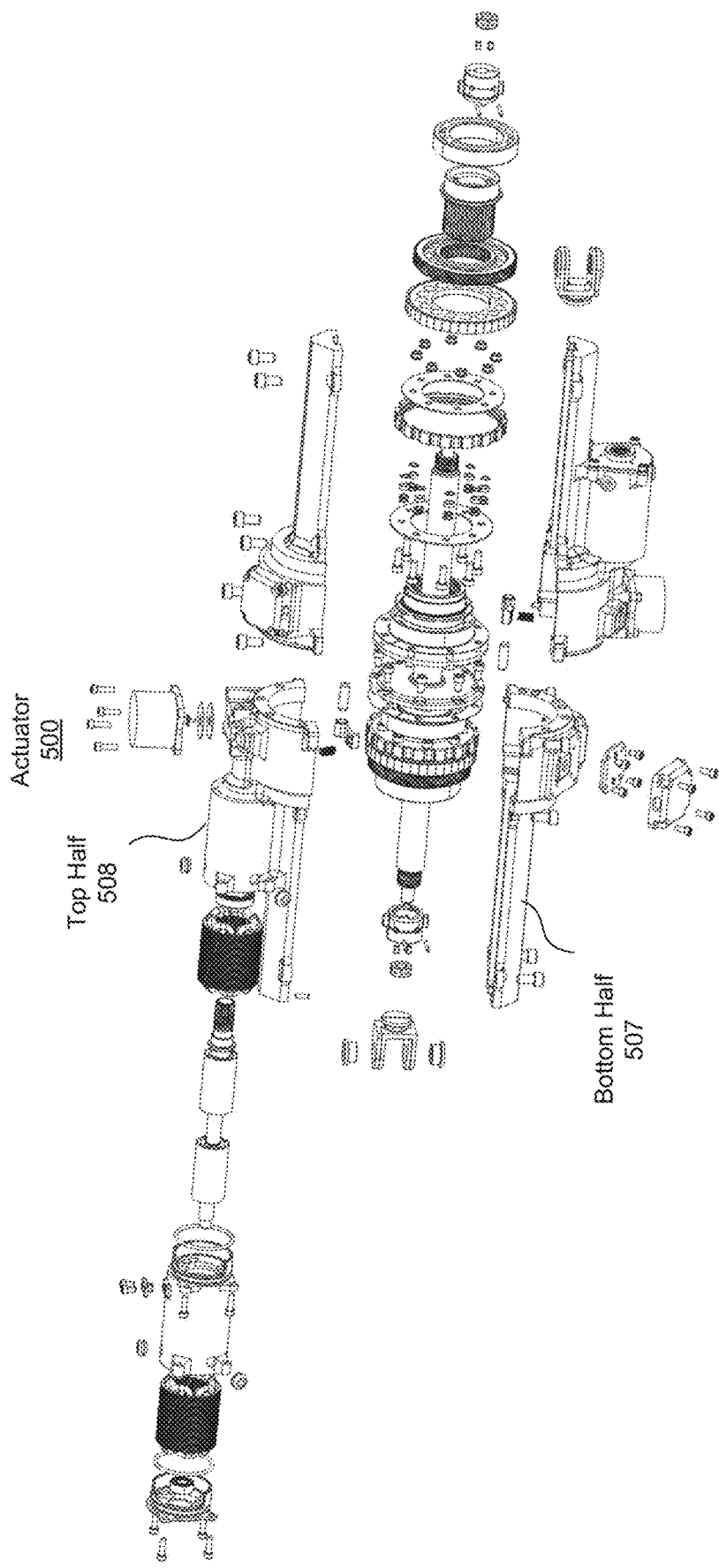
FIG. 5B is an exploded view of the actuator, according to one or more embodiments.
Figure 5C:
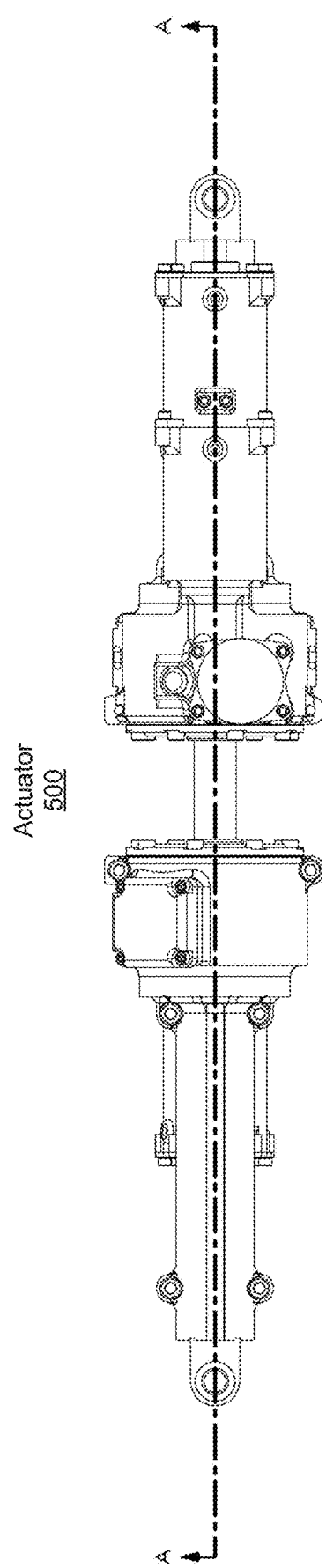
FIG. 5C is a top view of the actuator, according to one or more embodiments.
Figure 5D:
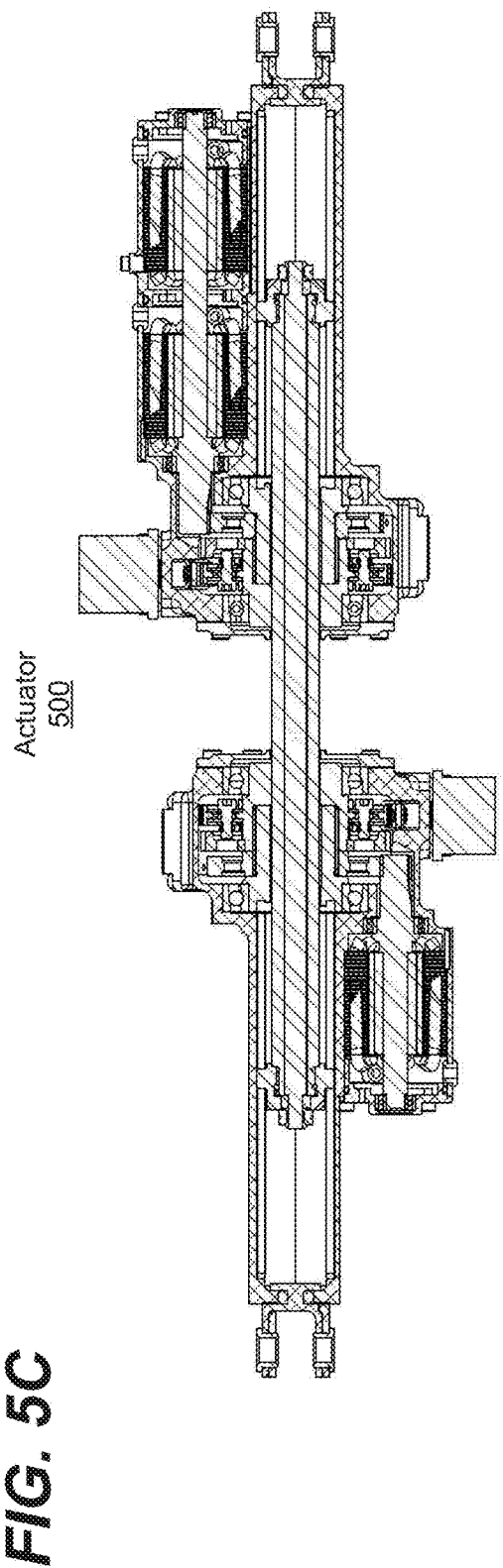
FIG. 5D is a first cross sectional diagram of the actuator, according to one or more embodiments.
Figures 5E, 5F:
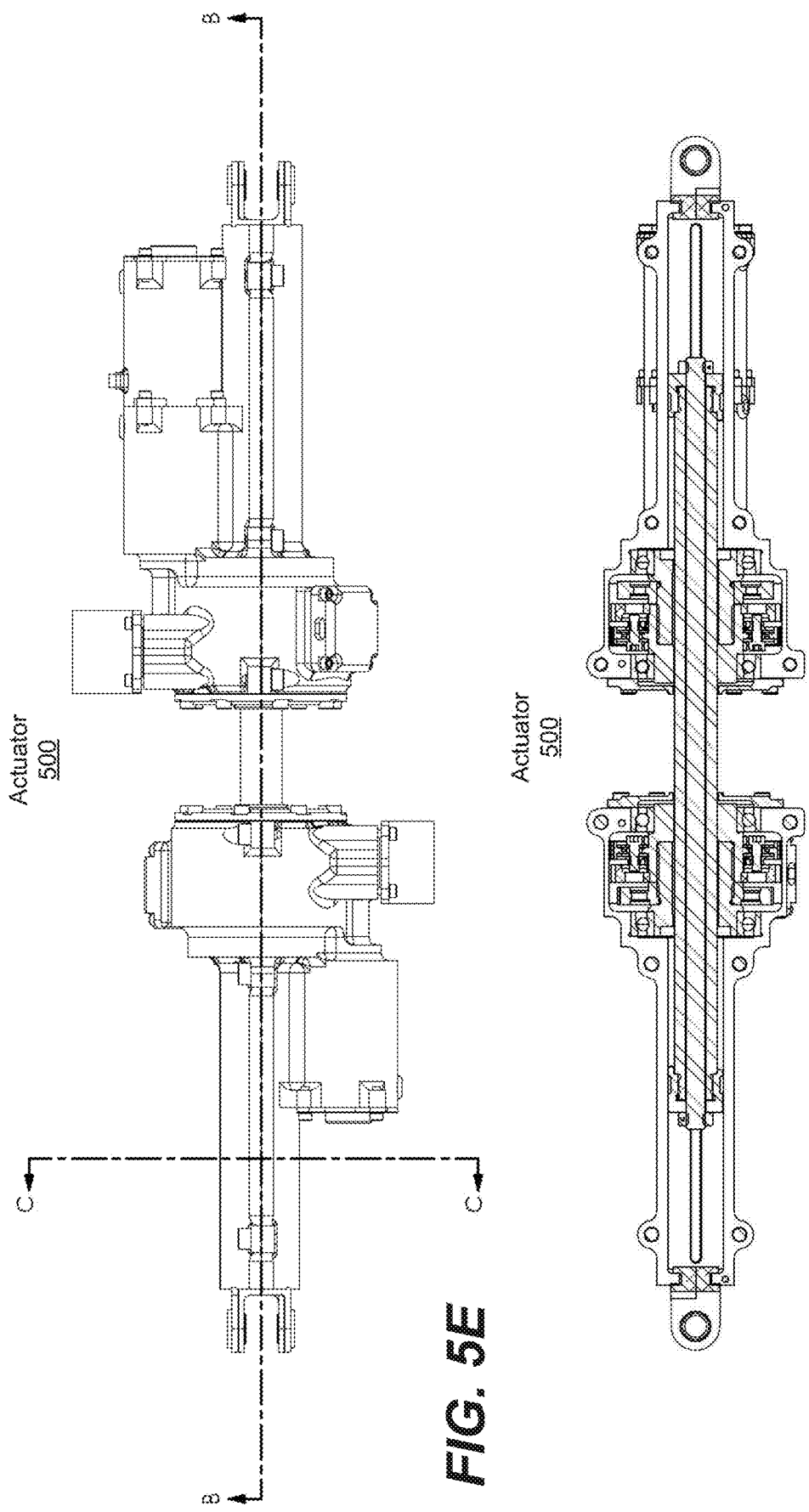
FIG. 5E is a side view of the actuator, according to one or more embodiments.
FIG. 5F is a second cross sectional diagram of the actuator, according to one or more embodiments.
Figure 5G:
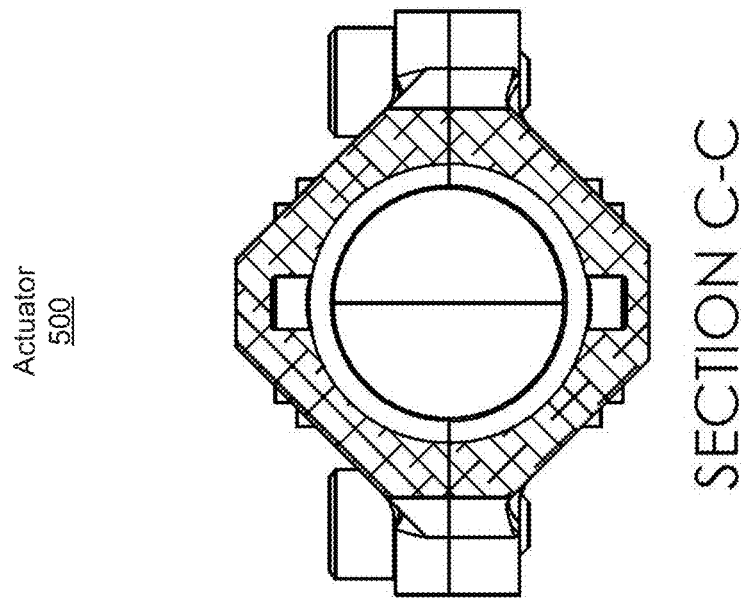
FIG. 5G is a third cross sectional diagram of the actuator, according to one or more embodiments.

FIGS. 5A-G are diagrams of another electro-mechanical actuator 500, according to one or more embodiments. FIG. 5A is a perspective view of the actuator 500. The actuator 500 may include components similar to actuator 400, such as a left unit 521A with a first housing 506A and a right unit 521B with a second housing 506B. FIG. 5B is an exploded view of the actuator 500. FIG. 5B illustrates that each housing 506A, 506B includes different portions (e.g., to form multiple load paths). Specifically, each housing includes a top half and a bottom half. In FIG. 5B, the top and bottom halves of the first housing are labeled (507, 508). FIG. 5C is a top view of the actuator 500. FIG. 5D is a cross sectional diagram of the actuator 500 along line A-A (in FIG. 5C). FIG. 5E is a side view of the actuator 500. FIG. 5F is a cross sectional diagram of the actuator 500 along line B-B (in FIG. 5E). FIG. 5G is a cross sectional diagram of the actuator 500 along line C-C (in FIG. 5E).

Figure 6:
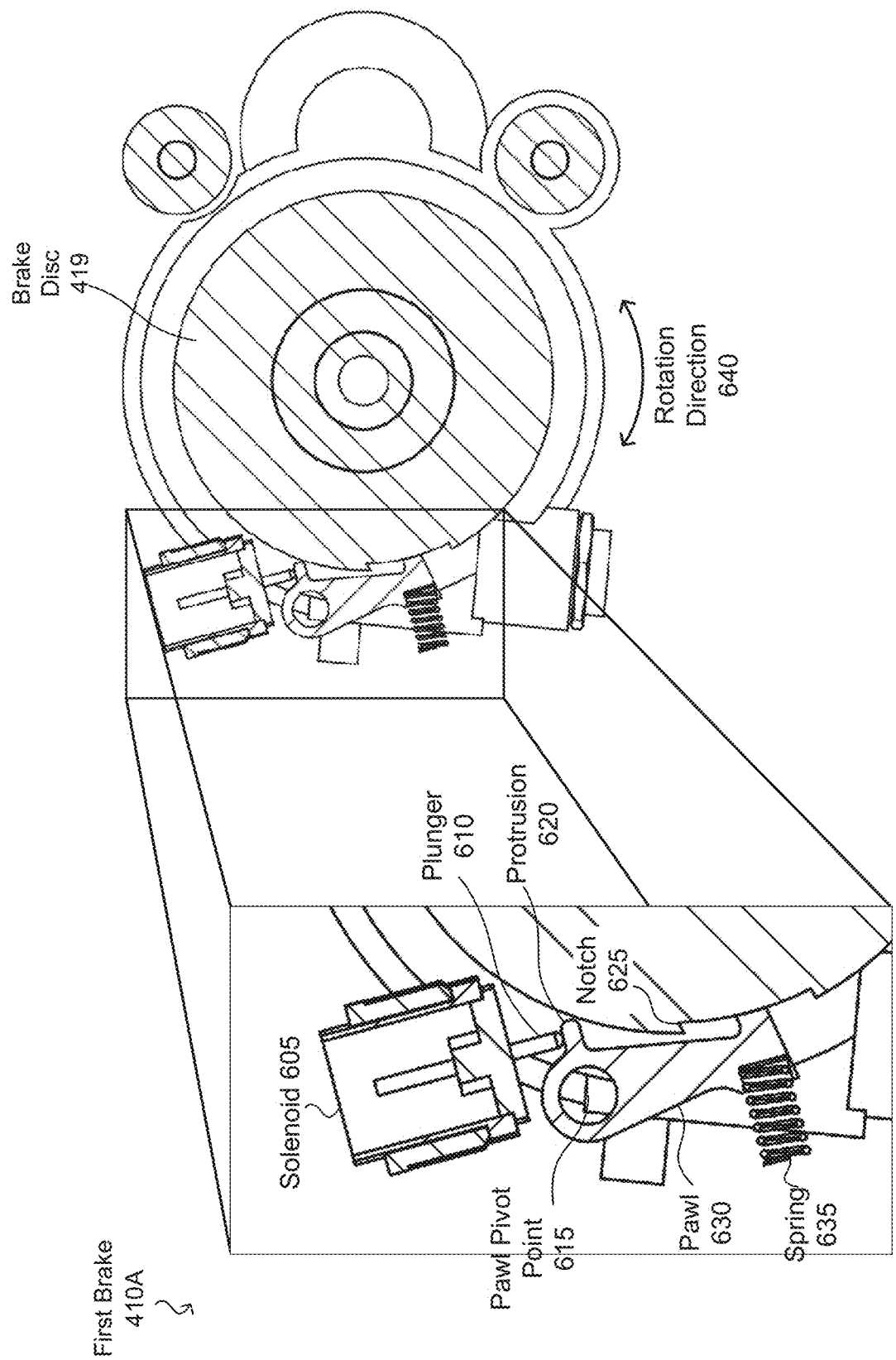
FIG. 6 is a magnified cross-sectional view of a brake of an actuator, according to one or more embodiments.

FIG. 6 is a magnified cross-sectional view of the first brake 410A as viewed from plane B-B' in FIG. 4A, according to one or more embodiments. The brake 410A includes a disk with a notch 625 (or a plurality of notches), a pawl 630, a spring 635, and a solenoid 605. The brake 410A may include additional, fewer, or different components than illustrated. Furthermore, the description of first brake 410A with respect to FIG. 6 may be applicable to brakes 410B and 410C.

The disk is coupled to the first ball nut 415A and rotates when the ball nut 415A rotates (see rotation direction 640). In some embodiments, the disk is a component of the ball nut 415A. The solenoid 605 is an actuator with a sliding plunger 610. When the plunger 610 is extended, it presses against a protrusion 620 of the pawl 630, which results in the pawl 630 rotating about the pivot point 615 and away from the disk. This allows the disk (and ball nut 415A) to rotate. The spring 635 applies pressure to the end of the pawl 630. If the solenoid 605 retracts the plunger 610, the spring 635 presses the end of the pawl 630 against the disk. As the disk rotates, the end of the pawl 630 eventually engages with the notch 625 and stops the disk from rotating, thus stopping the ball nut 415A from rotating about the ballscrew 417.

To control the brake 410A, the controller 445 may control the solenoid 605. In embodiments where an actuator (e.g., 400) includes multiple controller modules, a brake solenoid may be a dual solenoid (e.g., with dual coils) so that two or more of the controller modules may release the brake 410A.

Computing Machine Architecture

Figure 7:
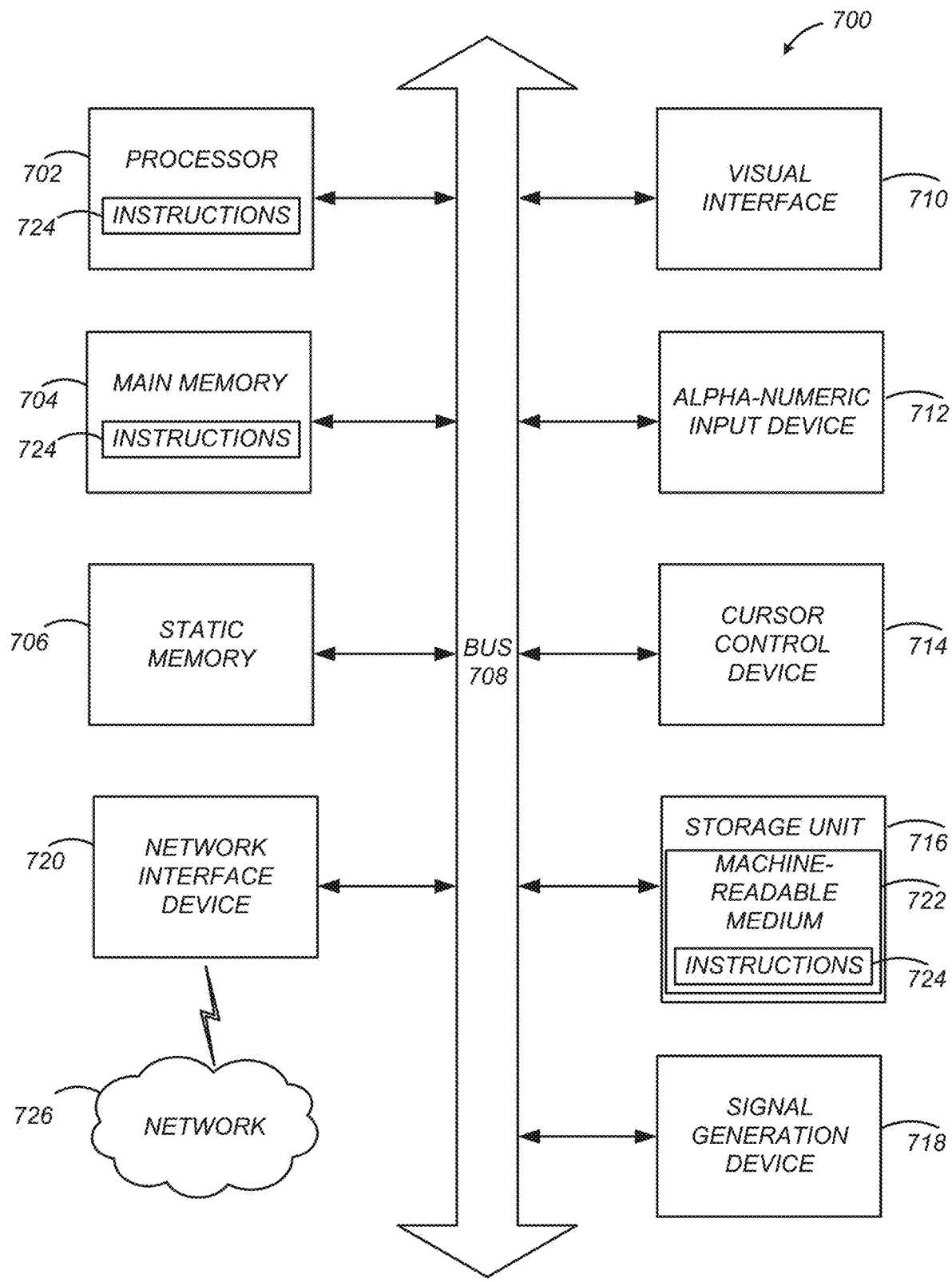
FIG. 7 is a block diagram illustrating components of an example machine able to read instructions from a machine-readable medium and execute them in a processor (or controller), according to one or more embodiments.

FIG. 7 is a block diagram illustrating one example embodiment of components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The computer system 700 may be used for one or more components of the vehicle control and interface system 100, the actuator (e.g., 300 and/or 400), or some combination thereof. The program code may be comprised of instructions 724 executable by one or more processors 702. In alternative embodiments, the machine operates as a standalone device or may be coupled (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes one or more processors 702 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 704, and a static memory 706, which are configured to communicate with each other via a bus 708. The computer system 700 may further include visual display interface 710. The visual interface may include a software driver that enables (or provide) user interfaces to render on a screen either directly or indirectly. The visual interface 710 may interface with a touch enabled screen. The computer system 700 may also include input devices 712 (e.g., a keyboard a mouse), a storage unit 716, a signal generation device 718 (e.g., a microphone and/or speaker), and a network interface device 720, which also are configured to communicate via the bus 708.

The storage unit 716 includes a machine-readable medium 722 (e.g., magnetic disk or solid-state memory) on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution.

Additional Configuration Information

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electro-mechanical actuator comprising:
   a screw;
   a nut coupled to the screw and configured to rotate about a screw axis of the screw, wherein the nut is an inverted nut; and
   a brake system comprising:
      a brake disc with a notch along an edge of the brake disc, the brake disc coupled to the nut and configured to rotate about the screw axis with the nut; and
      a pawl positioned to rotate about a pivot point, the pawl including an end portion configured to engage with the notch of the brake disc when the pawl is rotated about the pivot point.

2. The electro-mechanical actuator of claim 1, wherein the notch is on an outer edge of the brake disc.

3. The electro-mechanical actuator of claim 1, wherein the brake disc has a plurality of notches.

4. The electro-mechanical actuator of claim 1, wherein engagement of the end portion of the pawl with the notch of the brake disc inhibits the brake disc from rotating about the screw axis.

5. The electro-mechanical actuator of claim 4, wherein engagement of the end portion of the pawl with the notch of the brake disc inhibits the nut from rotating about the screw axis.

6. The electro-mechanical actuator of claim 1, wherein a controller is configured to, after a determination of a failure event, engage the brake system to stop or restrict the brake disc from rotating about the screw axis.

7. The electro-mechanical actuator of claim 6, further comprising a motor configured to rotate the nut about the screw axis of the screw, wherein the failure event is a failure of the motor.

8. The electro-mechanical actuator of claim 1, wherein the brake system further comprises:
an actuator with a sliding plunger coupled to the pawl and positioned to rotate the pawl about the pivot point to control engagement of the pawl with the notch of the brake disc.

9. The electro-mechanical actuator of claim 8, wherein retraction of the sliding plunger results in the end portion of the pawl engaging with the notch of the brake disc.

10. The electro-mechanical actuator of claim 8, wherein the actuator is a solenoid.

11. An electro-mechanical actuator comprising:
a screw;
a nut coupled to the screw and configured to rotate about a screw axis of the screw; and
a brake system comprising:
a brake disc with a notch along an edge of the brake disc, the brake disc coupled to the nut and configured to rotate about the screw axis with the nut;
a pawl positioned to rotate about a pivot point, the pawl including an end portion configured to engage with the notch of the brake disc when the pawl is rotated about the pivot point; and
a spring coupled to the pawl and positioned to rotate the pawl about the pivot point toward the brake disc.

12. The electro-mechanical actuator of claim 11, wherein the nut is a ball nut.

13. The electro-mechanical actuator of claim 11, wherein engagement of the end portion of the pawl with the notch of the brake disc inhibits the brake disc from rotating about the screw axis and inhibits the nut from rotating about the screw axis.

14. The electro-mechanical actuator of claim 11, wherein a controller is configured to, after a determination of a failure event, engage the brake system to stop or restrict the brake disc from rotating about the screw axis.

15. The electro-mechanical actuator of claim 11, wherein the brake disc has a plurality of notches.

16. An electro-mechanical actuator comprising:
a screw;
a nut coupled to the screw and configured to rotate about a screw axis of the screw; and
a brake system comprising:
a brake disc with a notch along an edge of the brake disc, the brake disc coupled to the nut and configured to rotate about the screw axis with the nut;
a pawl positioned to rotate about a pivot point, the pawl including an end portion configured to engage with the notch of the brake disc when the pawl is rotated about the pivot point; and
an actuator with a sliding plunger coupled to the pawl and positioned to rotate the pawl about the pivot point to control engagement of the pawl with the notch of the brake disc, wherein:
the actuator is a solenoid, and
the solenoid includes two coils and is configured to be controlled by different controller modules.

17. The electro-mechanical actuator of claim 16, wherein engagement of the end portion of the pawl with the notch of the brake disc inhibits the brake disc from rotating about the screw axis and inhibits the nut from rotating about the screw axis.

18. The electro-mechanical actuator of claim 16, wherein a controller is configured to, after a determination of a failure event, engage the brake system to stop or restrict the brake disc from rotating about the screw axis.

19. The electro-mechanical actuator of claim 16, wherein the brake disc has a plurality of notches.

20. An electro-mechanical actuator comprising:
a screw;
a nut coupled to the screw and configured to rotate about a screw axis of the screw, wherein the nut is coupled to a first half of the screw;
a second nut coupled to a second half the screw different from the first half and configured to rotate about the screw axis of the screw; and
a brake system comprising:
a brake disc with a notch along an edge of the brake disc, the brake disc coupled to the nut and configured to rotate about the screw axis with the nut; and
a pawl positioned to rotate about a pivot point, the pawl including an end portion configured to engage with the notch of the brake disc when the pawl is rotated about the pivot point.

21. The electro-mechanical actuator of claim 20, further comprising:
a second brake system comprising:
a second brake disc with a second notch along a second edge of the second brake disc, the second brake disc coupled to the second nut and configured to rotate about the screw axis with the second nut; and
a second pawl positioned to rotate about a second pivot point, the second pawl including a second end portion configured to engage with the second notch of the second brake disc when the second pawl is rotated about the second pivot point.

22. The electro-mechanical actuator of claim 20, wherein engagement of the end portion of the pawl with the notch of the brake disc inhibits the brake disc from rotating about the screw axis and inhibits the nut from rotating about the screw axis.

23. The electro-mechanical actuator of claim 20, wherein a controller is configured to, after a determination of a failure event, engage the brake system to stop or restrict the brake disc from rotating about the screw axis.

24. The electro-mechanical actuator of claim 20, wherein the brake disc has a plurality of notches.

25. The electro-mechanical actuator of claim 20, wherein:
the electro-mechanical actuator is coupled to a first mounting point and a second mounting point, and
movement between the nut and the second nut along the screw adjusts a distance between the first mounting point and the second mounting point.

26. The electro-mechanical actuator of claim 25, wherein the nut is coupled to the first mounting point by a first housing.

27. The electro-mechanical actuator of claim 25, wherein the electro-mechanical actuator is mounted to only the first mounting point and the second mounting point.

28. The electro-mechanical actuator of claim 25, wherein the electro-mechanical actuator is the only actuator coupled to the first and second mounting points.

* * * * *

UNITED STATES PATENT AND TRADEMARK OFFICE
CERTIFICATE OF CORRECTION

| | | |
|---|---|---|
| PATENT NO. | : 12,018,726 B2 | |
| APPLICATION NO. | : 18/143911 | |
| DATED | : June 25, 2024 | |
| INVENTOR(S) | : Manzanares et al. | |

It is certified that error appears in the above-identified patent and that said Letters Patent is hereby corrected as shown below:

In the Claims

In Column 22, in Claim 20, Line 14, delete "half the" and insert -- half of the --, therefor.

Signed and Sealed this
Twenty-ninth Day of October, 2024

*Katherine Kelly Vidal*

Katherine Kelly Vidal
*Director of the United States Patent and Trademark Office*